United States Patent
Miller et al.

[15] 3,666,076
[45] May 30, 1972

[54] TRANSPORTING SYSTEM

[72] Inventors: Robert C. Miller, Frederic, Wis.; Glenn R. Nevins, Minneapolis, Minn.

[73] Assignee: Honeywell Inc., Minneapolis, Minn.

[22] Filed: Dec. 18, 1970

[21] Appl. No.: 99,468

[52] U.S. Cl. ................................................... 198/1, 198/19
[51] Int. Cl. ............................................................. B23q 5/22
[58] Field of Search .............. 198/19, 34, 173; 104/165, 167; 214/1 P

[56] References Cited

UNITED STATES PATENTS

| | | | |
|---|---|---|---|
| 2,990,941 | 7/1961 | Peras | 198/173 X |
| 3,208,401 | 9/1965 | Freeman | 104/162 |

*Primary Examiner*—Edward A. Sroka
*Attorney*—Charles J. Ungemach, Ronald T. Reiling and Albin Medved

[57] ABSTRACT

Transporting apparatus in which work pallets are transported by means of variable engagement with a continuous metal band which apparatus provides sequential starting and stopping of the work pallets.

1 Claim, 11 Drawing Figures

Patented May 30, 1972 3,666,076

INVENTORS
ROBERT C. MILLER
GLENN R. NEVINS
BY
ATTORNEY

Patented May 30, 1972

INVENTORS
ROBERT C. MILLER
GLENN R. NEVINS

BY

ATTORNEY

INVENTORS
ROBERT C. MILLER
GLENN R. NEVINS
BY
ATTORNEY

Patented May 30, 1972

INVENTORS
ROBERT C. MILLER
GLENN R. NEVINS

BY *Allen Medwin*

ATTORNEY

TRANSPORTING SYSTEM

BACKGROUND OF THE INVENTION

1. Field of the Invention

This invention relates generally to power driven conveyors and more particularly concerns the type of conveyor used for article transportation.

2. Description of the Prior Art

In certain prior art arrangements, articles were transported by the use of rubber belts, but rubber belts have a drawback in that they are unable to turn even slight corners. In order to turn corners, a series of linear belts had to be coupled together in a cascade fashion and a means provided to push the articles onto the next cascading belt. An improvement in the art is U.S. Pat. No. 3,310,161 issued to L. S. Kraft, Jr. This patent describes a rubber conveyor belt which, being provided with sufficient perforations within the belt, is flexible enough to turn only slight corners when a force at each turning point either pushes or pulls the belt to form the corner. But rubber belts still have a drawback in that accurate alignment of the transported article upon the belt is difficult to maintain especially when the belt is made to turn even a slight corner. To solve this problem the article could be attached to the rubber belt, however, this approach would eliminate the ability to divert certain articles from the mainstream. A current system which does allow article transportation in a curved path employs a work pallet which is permanently engaged to a chain link metal conveyor. But, like fastening the work pallet to a rubber belt, the chain link system will not allow an article to be diverted from the mainstream.

BRIEF SUMMARY OF THE INVENTION

In accordance with the invention, work pallets are transported in sequential progression along a predetermined path by their engagement with a moving flexible metal band. Each work pallet has located on it a moveable member and means responsive to the moveable member for engagement with the band. In a first embodiment the engagement means is a boss which engages notches provided on the band when the lever is in a first position and which disengages the band notches when the lever is in a second position. A second embodiment has for the engagement means rollers which frictionally engage the band when the lever is in a second position. The lever is in a second position when it has cammed up the back of the work pallet immediately in front of the lever. The lever is in the first position when it has cammed down the back of the pallet immediately preceding.

Sequential starting and stopping of the individual pallets is provided by a camming action and the engagement means. When the engagement means consists of a boss upon the lever, variable starting is effected in the following manner. When the boss of a first pallet is allowed to engage the band, the work pallet will begin to move, but the second work pallet will not move until its lever has cammed down the moving work pallet's back and its boss has dropped into the space between notches on the band. When the moving band moves sufficiently to cause the next notch to reach the boss on the second work pallet, the second work pallet will begin to move. When the engagement means consists of rollers, the rollers are skewed such that when the lever has moved up the back of the work pallet in front of it the rollers are rolling over the band. However, when the work pallet in front of the lever has begun to move forward the second work pallet will not begin to move until the lever has cammed down the back of the moving work pallet and its roller has skewed itself sufficiently with respect to the belt so that rolling no longer exists and sufficient friction exists between the roller and the band to allow the band to drag the pallet along the supporting surface.

Accordingly, an object of the present invention is to provide an improved work pallet transportation system wherein the work pallets are not permanently engaged to the means which provide the motion.

Another object of the present invention is to provide an improved work pallet transportation system which provides sequential starting and stopping of the work pallet.

A further object of the present invention is to provide an improved work pallet transportation system which is simple in construction and which is capable of negotiating sharp curves while at all times maintaining accurate alignment of the work pallet and also allowing diversion of the pallets from one path to another.

Various other objects, advantages, and features of novelty which characterize our invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter in which there are illustrated and described certain preferred embodiments of the invention.

DESCRIPTION OF THE PREFERRED EMBODIMENT

Figure 2:
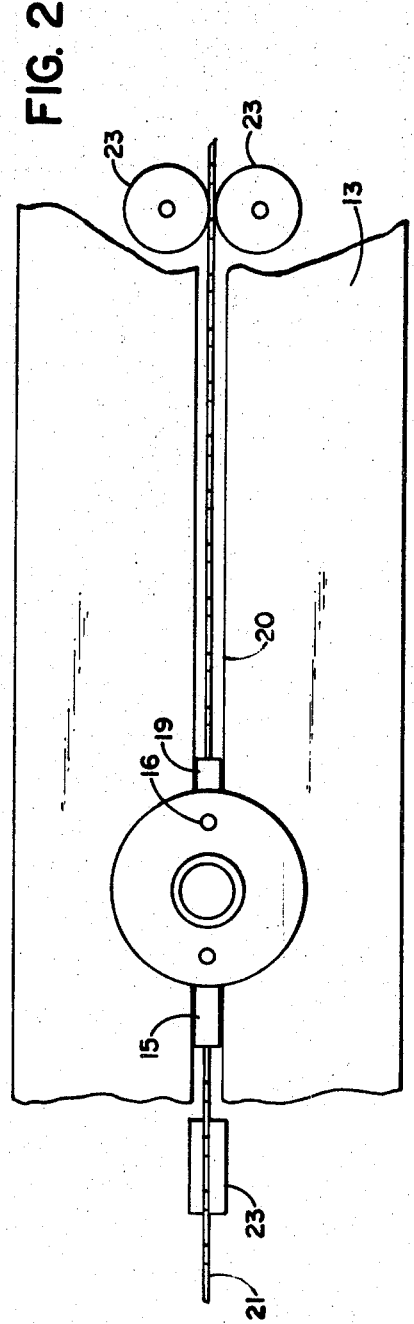
FIG. 2 is a top view of the first embodiment.
Figure 1:
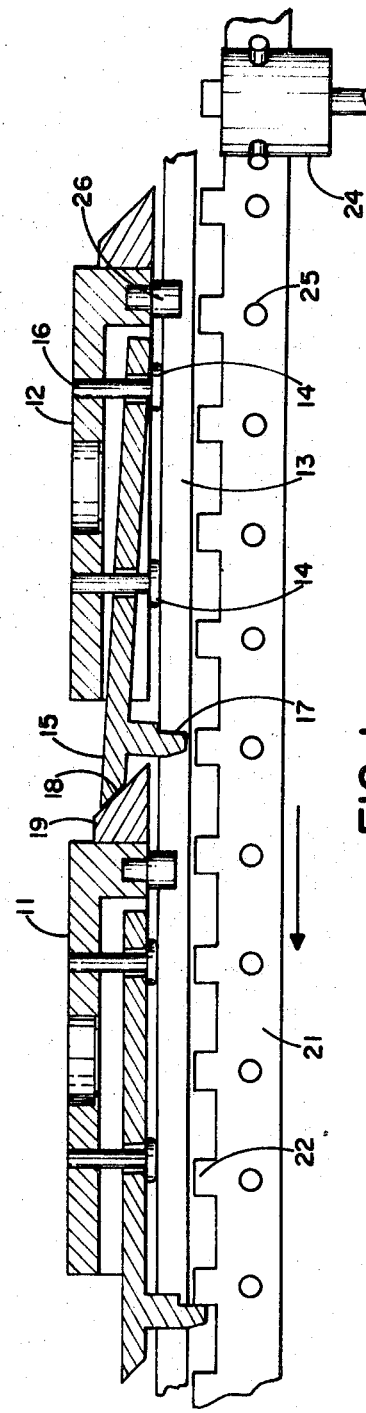
FIG. 1 is a cutaway view of a first embodiment of the invention.

Referring now to FIGS. 1 and 2 of the drawing, a work pallet 11 and a work pallet 12 rest upon support 13. Support 13 defines a working plane. Pallets 11 and 12 are substantially identical. Pallet 12 has located on its lower surface pads 14 which make the actual contact with support 13. Pads 14 can be constructed of bronze or any other material which has a high resistance to wear and provides low friction. Pallet 12 has a lever 15 which pivots vertically about screw 16. Lever 15 has a boss 17 which is located toward its forward end. Lever 15 also has a cam surface 18 which is capable of camming up surface 19 of the pallet immediately in front of the lever.

Figure 3:
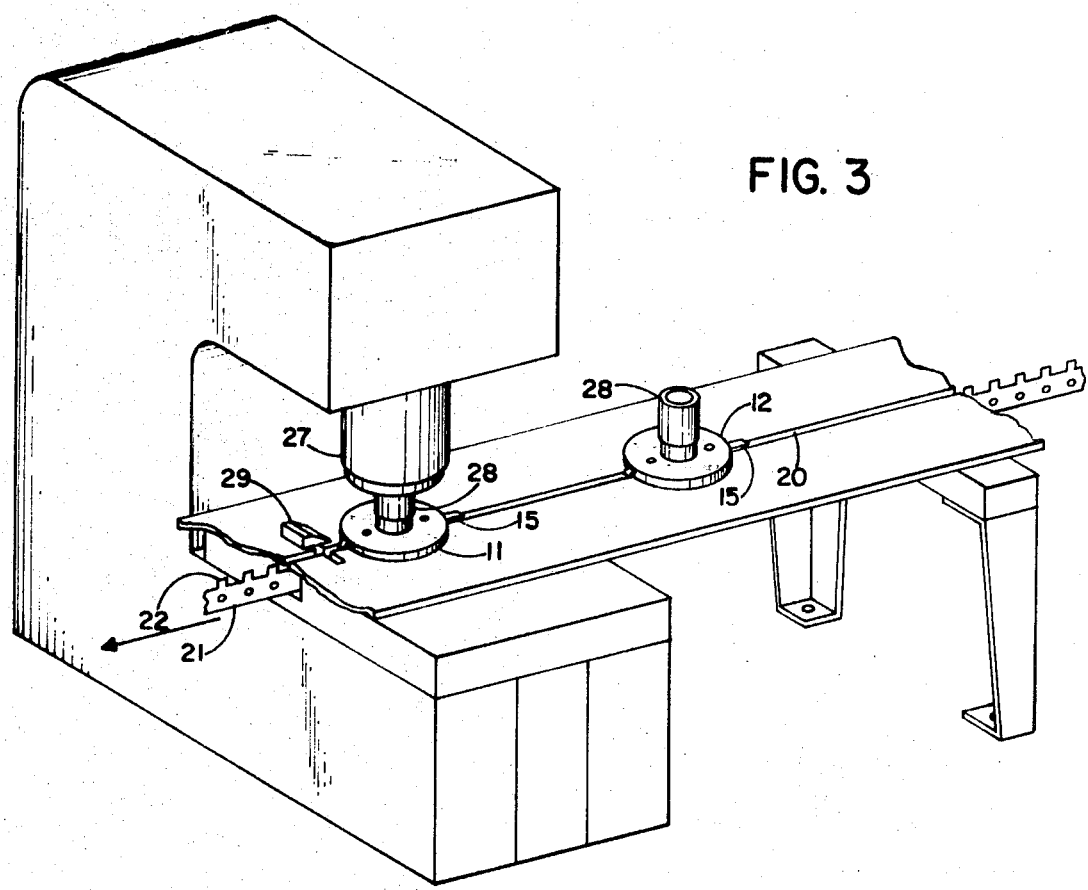
FIG. 3 is another view of the first embodiment.

Referring now to FIGS. 1, 2, and 3, located within a groove 20 in support 13 is flexible band 21. Groove 20 provides the path which the individual pallets follow. Flexible band 21 provides the motive force for the work pallets. It is constructed of steel and is approximately 0.050 inches thick by 2 inches wide. Utilizing such a thin belt provides flexibility to allow the belt to negotiate curves. The band is flexible in the direction normal to the groove 20 and non-flexible in the direction normal to the working plane. Being non-flexible in the direction normal to the working plane will provide a substantially non-sagging belt. Uniformly spaced on one edge of band 21 are notches 22 which notches are capable of engagement with the work platform boss 17. Band 21 is mounted on its narrow edge with the notches 22 facing upward. Each notch 22 is approximately one-half inch long and they are spaced at approximately a 2-inch interval. The band is centrally positioned beneath the work platform and is supported on its two flat sides and bottom edge by adjustable guide rollers 23. Any directional change of the band is accomplished by passing the flat side of the band over a guiding wheel. Power is provided by a variable speed drive mechanism (not shown) and the band is driven by a sprocket wheel 24 which engages the center line perforations 25 and the broad flat side of the band. Guide 26 aids boss 17 in retaining the alignment of pallet 11 with respect to support 13.

FIG. 3 shows an assembly station 27 where work is done upon a work piece 28. Provided at station 27 is a moveable protrusion 29 which will lift lever 15 upward and disengage boss 17 from band 21 thus providing a stationary work pallet.

In operation, band 21 is a driven continuous band. Pallets 11, 12, or any additional pallets which may be located upon support 13, may be moving or may be stopped either at an assembly station or stopped because they have come upon a stationary pallet. The stopping can be understood by examining FIGS. 1, 2, and 3. Pallet 11 is stopped by arriving at work station 27. Protrusion 29 causes lever 15 to move upward, thus disengaging boss 17 from band 21. When this has occurred, pallet 11 will remain stationary at work station 27. Meanwhile, all of the remaining work pallets will continue to be engaged with band 21 and will continually move forward. However, when work pallet 12 arrives at work pallet 11, cam surface 18 on lever 15 will begin to cam upward upon cam surface 19 of pallet 11 and thus disengage boss 17 from band 21. This process will continue for all pallets which are behind pallet 12. When work has been completed upon pallet 11, protrusion 29 can be removed and lever 15 will move downward, placing boss 17 within the space between notches 22 on band 21.

Forward movement of band 21 causes notch 22 of band 21 to engage boss 17. When engagement occurs moving band 21 will move pallet 11 forward. As pallet 11 moves forward, cam surface 18 of pallet 12 will cam down cam surface 19 and boss 17 will move within the space between notches 22 on band 21. As band 21 continually moves forward notch 22 will engage boss 17 and pallet 12 will begin to move forward.

Thus, it can be seen that in stopping the first pallet all remaining pallets will continue to move forward until they have cammed up the pallet immediately preceding and will then stop, thus providing for sequential stopping of each pallet. And, as the first pallet is allowed to engage band 21 it will begin to move forward and the second pallet will not move forward until the camming action has occurred and its boss is picked up by notch 22. Thus, sequential starting of each work pallet is provided. Sequential starting and stopping is important in order to eliminate the huge inertial force created when all work pallets are started or stopped at the same time.

Figure 4:
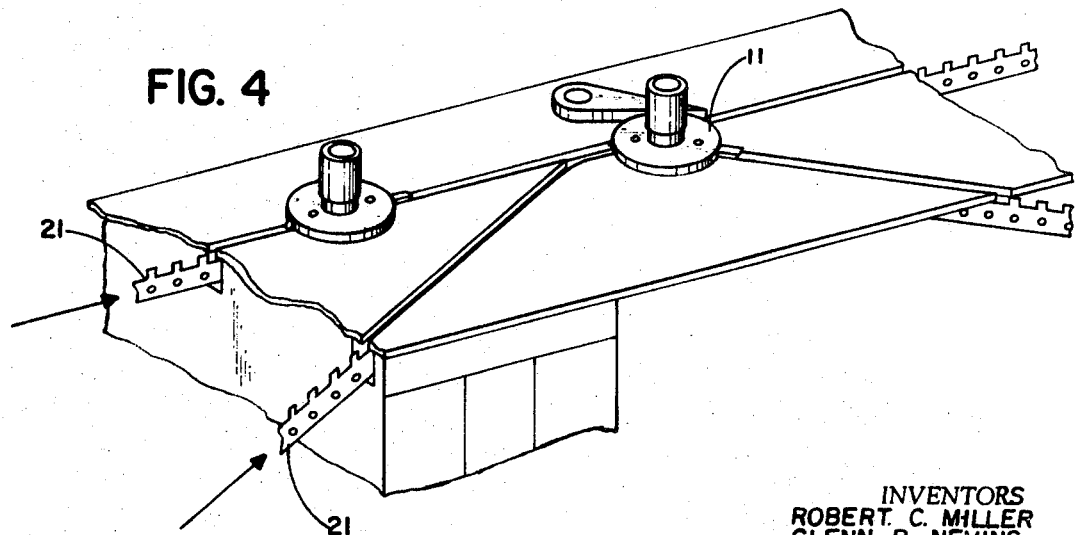
FIG. 4 shows a diversion technique.

FIG. 4 shows that by providing a second blade 21 which runs contiguous for a certain duration to the first blade 21 and which blade is made to divert away and then turn a corner, and a means provided to push pallet 11 toward the direction of the blade making the corner, the work platform 11 can be diverted from the mainstream and in an alternate direction.

Figure 5:
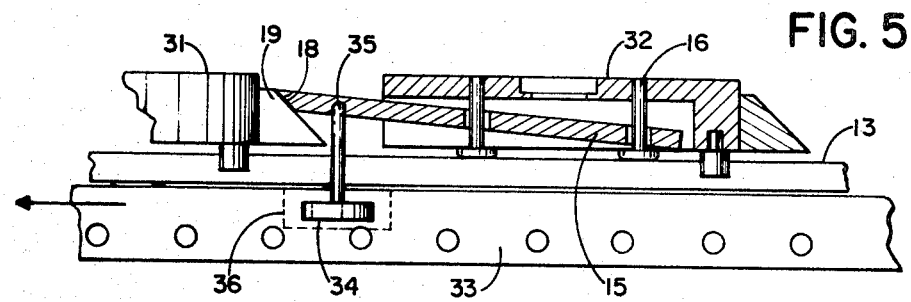
FIG. 5 is a cutaway view of a second embodiment of the invention.
Figure 6:
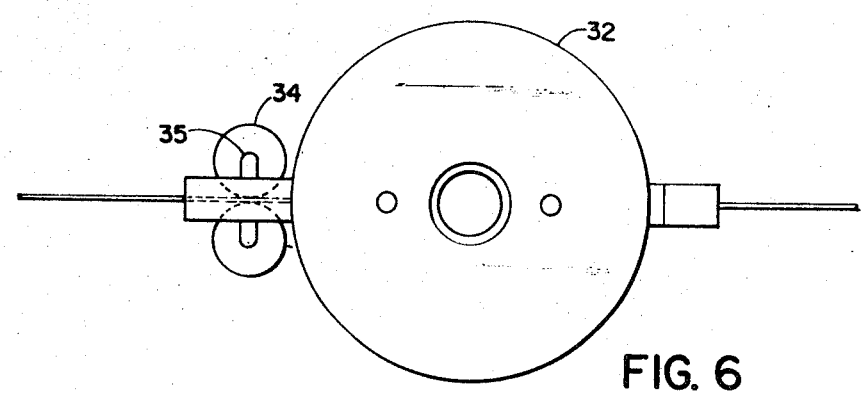
FIG. 6 is a top view of the second embodiment.
Figure 7:
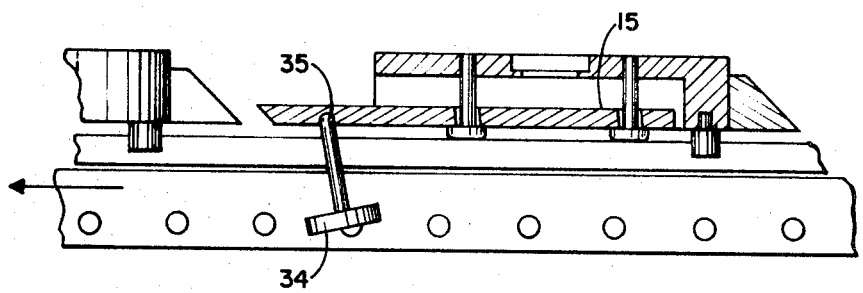
FIG. 7 is another cutaway view of the second embodiment.

Referring now to FIGS. 5, 6, and 7, a second embodiment of the invention is shown. FIG. 6 is a top view of FIG. 5. A work pallet 31 and a work pallet 32 are shown resting upon support 13. Pallets 31 and 32 are substantially identical. The distinction between the second embodiment of the invention and the first embodiment of the invention lies in the means provided upon lever 15 for engagement with band 33. The engagement means consists of rollers 34. Rollers 34 are connected to lever 15 by shaft 35. Band 33 is not provided with notches 22 as was band 21, however, it is to be noted that the second embodiment could operate just as well with a band 21. Band 33 is driven in the same manner as band 21 and is used for the same purpose to transport the pallets to the various assembly stations.

As shown in FIG. 5, when cam surface 18 of lever 15 has cammed up surface 19 of pallet 31, belt 33 will roll roller 34 about shaft 35 since shaft 35 is substantially perpendicular to the motion of the band. But when pallet 31 has moved forward cam surface 18 will move down cam surface 19 and shaft 35 and roller 34 will assume the position shown in FIG. 7. With lever 15 in this position, and band 33 moving, rollers 34 will not be able to roll upon band 33 and the friction between them will pull pallet 32 along surface 13. Thus, when the lever 15 is in a skewed first position as shown in FIG. 7, movement of the pallet is provided but when the lever assumes a second position, like that shown in FIG. 5, the pallet will remain stationary.

Thus, the embodiment shown in FIG. 3 provides the important feature of sequential starting and stopping. Additionally, it is to be noted that, work pallet 31 will not move instantaneously to the band speed but will move slowly up to speed as the friction between the band and the rollers is increased by the continued skewing of roller 34 when cam surface 18 is camming down cam surface 19. That is, as lever 15 moves downward roller 34 slowly goes from pure rolling to no rolling and this process gradually brings the pallet up to the speed of the band.

The diverting of a work pallet from the mainstream can be accomplished by making the rollers spring urged toward the band but capable of moving outward to accommodate the thickness of two bands by bringing the second band which is to pick off the pallet contiguous to the first band and providing a discontinuity in the first band (shown as 36 in FIG. 5) at the point where the force is provided which pushes the pallet toward the diverting band.

Figure 8:
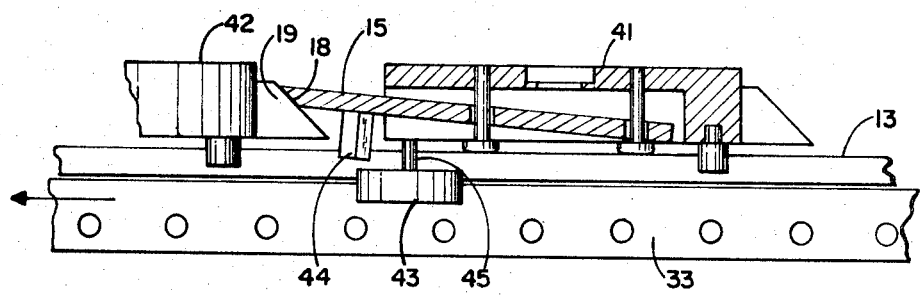
FIG. 8 is a cutaway view of a third embodiment.
Figure 9:
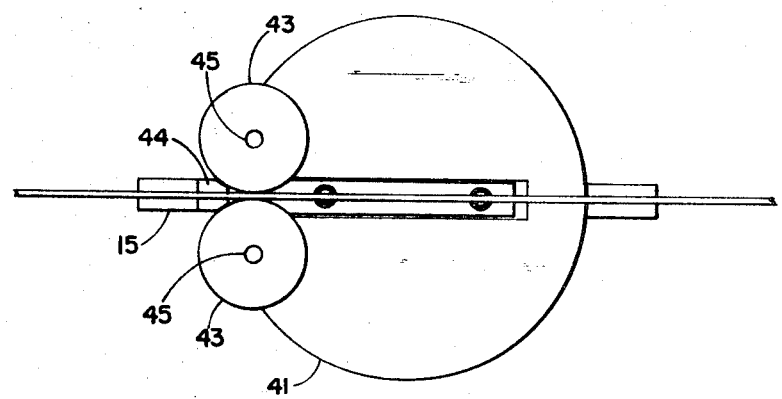
FIG. 9 is a bottom view of the third embodiment.

Referring now to FIGS. 8 and 9 a third embodiment of the invention is shown. FIG. 9 is a view looking from the bottom of FIG. 8. Work pallet 41 and work pallet 42 are shown resting upon support 13. Pallets 41 and 42 are substantially identical. The engagement means consists of rollers 43 and boss 44 which is located on lever 15. Rollers 43 are connected to pallet 41 by shaft 45. Band 33 is driven in the same manner as band 21 of FIG. 1.

As shown in FIGS. 8 and 9 when cam surface 18 has cammed up surface 19 of pallet 42, belt 33 will roll rollers 43 about shaft 45. But when pallet 42 has moved forward cam surface 18 will move down cam surface 19 and boss 44 will frictionally engage rollers 43 as shown in FIG. 9. With boss 44 in this position, and band 33 moving, rollers 43 will not be able to roll upon band 33 and the friction between them will pull pallet 41 along surface 13.

This embodiment also provides sequential starting and stopping of individual pallets and also is able to accomplish non-instantaneous acceleration of each pallet. Diverting of individual pallets can be accomplished in the same manner as available for the second embodiment.

Figure 10:
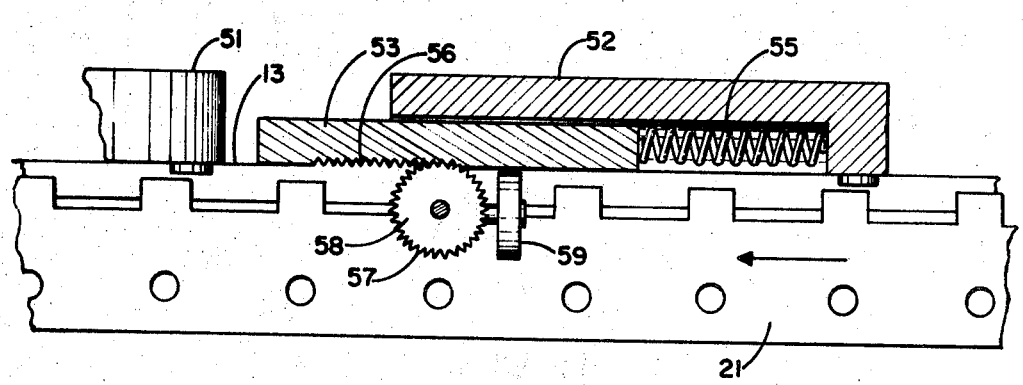
FIG. 10 is a cutaway view of a fourth embodiment.
Figure 11:
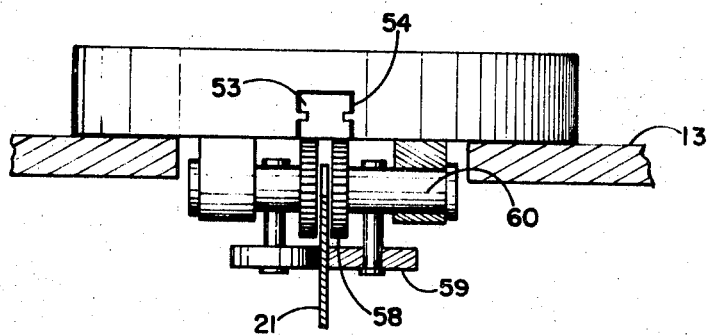
FIG. 11 is a front view of the fourth embodiment.

Shown in FIGS. 10 and 11 is a fourth embodiment of the present invention. FIG. 11 is a view look at the front of FIG. 10. Work pallet 51 and work pallet 52 are substantially identical. Rack 53 is shown within groove 54 of pallet 52. Compression spring 55 tends to retain rack 53 in this position. Rack 53 has teeth 56 which engage teeth 57 located upon pinion gear 58. Rollers 59 are shown attached to assembly 60 which also attaches gear 58.

In operation, when pallet 51 is stopped at a work station, rack 53 will contact the rear of pallet 51 thus compressing spring 55 and moving rack 53 backwards. This movement turns gear 58 which turns assembly 60 and thus turns rollers 59 from their position in FIG. 10 to their position in FIG. 9. As shown in FIG. 11 rollers 59 will roll upon belt 21 causing pallet 52 to remain stationary. When pallet 51 moves forward, after work has been completed upon it, rack 53 will again move outward. This movement will turn gear 58 so that rollers 59 assume the position shown in FIG. 10. In this position rollers 59 cannot roll and they provide frictional engagement with belt 21 and thus movement of pallet 52 along surface 13.

While this invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations, as fall within the spirit and scope of the appended claims.

I claim as my invention:

1. Apparatus for transporting a plurality of articles in sequential progression along a predetermined path, said apparatus comprising:
   a support means defining a work plane;
   a continuous band positioned and held by said support means within said working plane for motion on the locus of said predetermined path, said band being substantially flexible in the direction normal to said path within said plane and substantially non-flexible in the direction normal to said plane;

means connected to said band for imparting motion to said band in response to a motor;

a plurality of article carrying means positioned on said working plane along said predetermined path;

a moveable member located upon each said article means moveable responsive to contact with the article carrying means directly preceding, said moveable member comprising a pivotal lever; and engagement means responsive to a predetermined position of said moveable member, for variable engagement with said band, said engagement means comprising a boss located upon a moveable end of said lever of said moveable member and a plurality of rollers connected to said article carrying means by shafts, said rollers being rollable about said shaft such that when said lever is in a first position said rollers are free to roll upon said band and when said lever is in a second position said boss is frictionally engaged to said rollers preventing them from rolling upon said band, thereby providing frictional engagement between said rollers and said band, resulting in movement of said article carrying means.

* * * * *